US012559302B2

(12) United States Patent
Mei

(10) Patent No.: US 12,559,302 B2
(45) Date of Patent: Feb. 24, 2026

(54) TOP DOOR SYSTEM FOR A TOP-LOADABLE CARGO CONTAINER

(71) Applicant: MODALIS S.A.S., Aix-en-Provence (FR)

(72) Inventor: Bernard Mei, Aix-en-Provence (FR)

(73) Assignee: MODALIS S.A.S., Aix-en-Provence (FR)

( * ) Notice: Subject to any disclaimer, the term of this patent is extended or adjusted under 35 U.S.C. 154(b) by 426 days.

(21) Appl. No.: 18/024,998

(22) PCT Filed: Sep. 7, 2021

(86) PCT No.: PCT/EP2021/074597
§ 371 (c)(1),
(2) Date: Mar. 7, 2023

(87) PCT Pub. No.: WO2022/049305
PCT Pub. Date: Mar. 10, 2022

(65) Prior Publication Data
US 2023/0331468 A1 Oct. 19, 2023

(30) Foreign Application Priority Data
Sep. 7, 2020 (EP) .................................... 20315404

(51) Int. Cl.
*B65D 88/12* (2006.01)
*B60J 7/16* (2006.01)
(Continued)

(52) U.S. Cl.
CPC .......... *B65D 88/126* (2013.01); *B60J 7/1621* (2013.01); *B62D 33/04* (2013.01);
(Continued)

(58) Field of Classification Search
CPC .. B65D 88/126; B65D 90/0086; B65D 90/66; B65D 90/623; B65D 2590/664;
(Continued)

(56) References Cited

U.S. PATENT DOCUMENTS 4,210,358 A * 7/1980 Sweet ........................ B60P 7/02
296/100.1
4,302,044 A 11/1981 Sims
(Continued)

FOREIGN PATENT DOCUMENTS

CN 202144276 U * 2/2012
DE 19637907 A1 * 3/1998 ............ B60J 7/1614
(Continued)

OTHER PUBLICATIONS

Zou (CN 202144276 U), machine translation (Year: 2012).*
(Continued)

*Primary Examiner* — Amy R Weisberg
*Assistant Examiner* — Wenwei Zhuo
(74) *Attorney, Agent, or Firm* — Workman Nydegger

(57) ABSTRACT

An automated top door system is provided for selectively closing and opening a cargo container for top loading of cargo. The top door system includes: a door panel, a rotary actuator driven by a motor, and a coupling means connecting the door panel and the rotary actuator. The door panel is a self-supporting structural lightweight door panel, and the coupling means, which is a separate part or is part of said door panel, is configured to provide rotational movement of the door panel around a rotational axis of the rotary actuator, in response to the rotary movement provided by the rotary actuator, when in use. A top-loadable cargo container includes an automated top door system; and uses of the automated top door system in transport vehicles.

20 Claims, 7 Drawing Sheets

(51) Int. Cl.

| | |
|---|---|
| *B62D 33/04* | (2006.01) |
| *B65D 90/00* | (2006.01) |
| *B65D 90/62* | (2006.01) |
| *B65D 90/66* | (2006.01) |
| *E05F 15/00* | (2015.01) |

(52) U.S. Cl.
CPC ....... *B65D 90/0086* (2013.01); *B65D 90/623* (2013.01); *B65D 90/66* (2013.01); *B65D 2590/664* (2013.01); *E05F 15/00* (2013.01); *E05Y 2900/516* (2013.01)

(58) Field of Classification Search
CPC ..... B65F 1/1646; B65F 1/1638; B60J 7/1607; B60J 7/1621; B60J 7/1204; B60J 7/141; B62D 33/04; B62D 33/046; B61D 39/006
USPC .......... 296/185.1, 183.1, 181.3, 191, 100.01, 296/101, 100.06, 100.1; 105/377.06
See application file for complete search history.

(56) References Cited

U.S. PATENT DOCUMENTS

| | | | | |
|---|---|---|---|---|
| 4,542,931 | A * | 9/1985 | Walker, Jr. .............. | B60J 7/141 |
| | | | | 296/100.1 |
| 4,627,658 | A | 12/1986 | Vold et al. | |
| 4,767,152 | A * | 8/1988 | Stluka ...................... | B60J 7/141 |
| | | | | 296/100.1 |
| 5,445,861 | A | 8/1995 | Newton et al. | |
| 7,059,665 | B2 * | 6/2006 | Murai .................... | B29C 70/22 |
| | | | | 296/191 |
| 7,541,085 | B2 | 6/2009 | Burdon | |
| 7,967,363 | B2 * | 6/2011 | Schaefer .............. | B61D 39/001 |
| | | | | 296/100.06 |
| 10,118,652 | B2 | 11/2018 | Maertens et al. | |
| 2008/0001429 | A1 * | 1/2008 | Willis ................... | B29C 70/305 |
| | | | | 296/181.2 |
| 2010/0164190 | A1 * | 7/2010 | Kloepfer ................. | B60P 3/42 |
| | | | | 280/30 |
| 2012/0043782 | A1 * | 2/2012 | Fliegl ...................... | B60J 7/141 |
| | | | | 296/100.02 |
| 2013/0036673 | A1 * | 2/2013 | Wassenaar ............ | B65D 90/66 |
| | | | | 220/1.5 |
| 2016/0332557 | A1 * | 11/2016 | Royer ..................... | B60J 7/085 |
| 2018/0050739 | A1 * | 2/2018 | Maertens ............... | E05D 3/125 |
| 2019/0100089 | A1 * | 4/2019 | Lees ....................... | B60J 10/30 |

FOREIGN PATENT DOCUMENTS

| | | | | | |
|---|---|---|---|---|---|
| KR | 20180096024 | A | * | 8/2018 | ............... B60P 7/02 |
| KR | 20180128575 | A | | 12/2018 | |
| WO | 2016179680 | A1 | | 11/2016 | |

OTHER PUBLICATIONS

Exnowski (DE 19637907 A1), machine translation (Year: 1998).*
Lee (KR 20180096024 A), machine translation (Year: 2018).*
Wayback Machine, Moreira, "Hybrid composites for the Space industry", EUCASS; https://www.eucass.eu/doi/EUCASS2019-0727. pdf (Year: 2020).*
International Search Report and Written Opinion from PCT Application No. PCT/EP2021/074597, Dec. 1, 2021.
Search Report from corresponding European Application No. 20315404. 2, Feb. 10, 2021.

\* cited by examiner

Fig. 2D
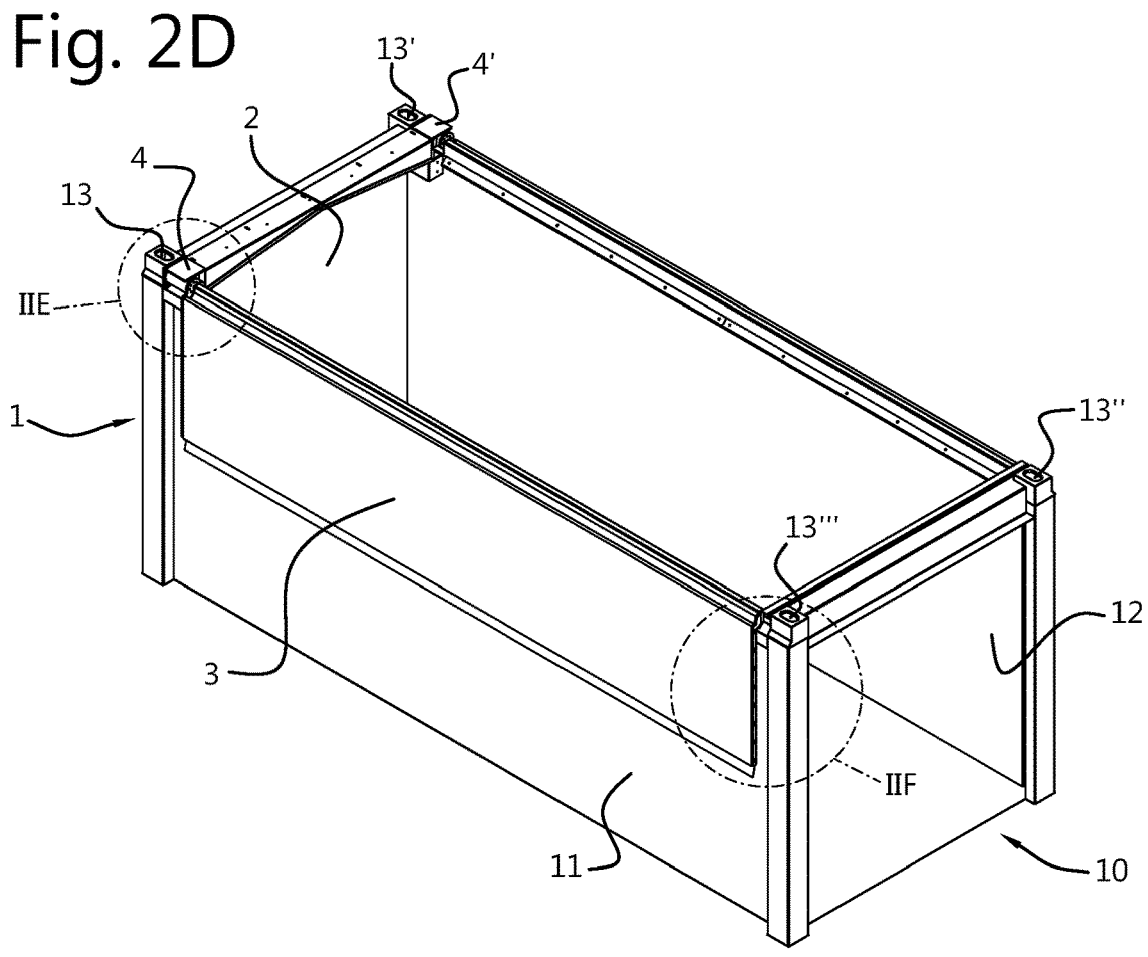
Fig. 2E
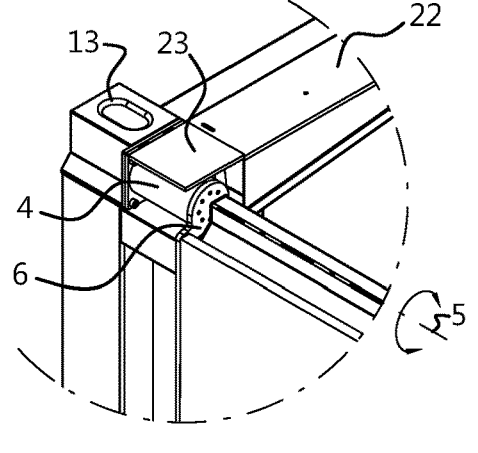
Fig. 2F

TOP DOOR SYSTEM FOR A
TOP-LOADABLE CARGO CONTAINER

TECHNICAL FIELD

The invention relates to a top door system for top-loadable cargo containers. The invention is situated in the field of cargo transportation.

BACKGROUND

Top-loadable cargo containers are well-known in the art. A top-loadable cargo container is open at the top. Hence, they are also named open top container. A top-loadable container is particularly suitable for the transportation of goods that do not fit in regular containers due to their size. The cargo may be loaded through the top opening of the container using a loader or directly from a feed source such as an overhead chute.

A tarpaulin or other sheet covering is commonly used to cover the top opening of the container prior to transportation of the cargo. A common problem with the use of tarpaulins is that they are subject to damage by puncturing or otherwise by contact with the contents of the trailer. Tarpaulins are cumbersome and time-consuming to mount and unmount from the cargo container. The tarpaulin may become loose and/or shift out of a desired covering position.

Tarpaulins are often used in a curtain system. The framework of the curtain system takes up a considerable amount of space. This reduces the size of the top opening and makes the loading process more difficult. Removing the curtain system prior to loading cargo is time consuming.

Alternatively, a cargo container may be provided with one or more top doors which may be closed to protect the loaded cargo from contamination or from being disturbed or blown about or out of the container during transport. A top door is typically mounted to the container along an adjoining upper edge of a sidewall of the container by means of a number of hinges.

In some conventional top-loadable cargo containers, the top doors and hinges are configured such that the doors can be moved away from the container opening at the top. However, the doors project outwardly from the sides of the container causing a hazard to workers and equipment moving about the container. Other problems are hinges that project past the sidewalls of the container when the top doors are fully closed. In jurisdictions where transportation widths are regulated and limited, any overhang of the hinges may result in a container having a smaller width and therefore a reduced capacity, which is a disadvantage. Similarly, any construction atop a transport container may prevent the cargo container from being stackable. This has a negative impact on transportation costs.

The transport of loosely compacted materials such as garbage, may create structural challenges upon compression of the loose materials in the cargo space.

In US 2019/0100089 a cargo container is provided wherein the container walls are narrower in the proximity of the open top, the hinges are positioned on the outside of the container. This prevents the hinges of the hinged top door system from projecting past the sidewalls of the container. However, the opening of the cargo container has become smaller. In addition, this is a specialty shipping container. This is disadvantageous for the transportation costs. Moreover, the top door system comprises a frame and several individual panels. This makes the system complex and time-consuming to construct and use.

WO 2016/179680 discloses a top loadable cargo trailer having two top doors mounted to a container using hinge assemblies which are located within the perimeter of the container when the top door is closed. Again, this is realized with walls which are narrower near the top of the container. The hinge assemblies allow for the doors to rotate through 270 degrees, with the result that in a fully open position the doors rest flush against an outside surface of the container wall when the top door is in the fully open position. However, the top door opening mechanism is attached on the outside of the container. It is complex and takes up a lot of space. In addition, the bulky configuration adds to the total weight of the transport. In jurisdictions where the total weight of the transport is regulated and limited, any heavy contributions leave less weight options for the cargo.

U.S. Pat. No. 4,302,044 discloses a road truck having a hard-top truck body wherein the roof doors are pivotably mounted on opposite sides of the body. The top door panels are resting on a support frame. The frame needs to be removed prior to loading of the truck, which is cumbersome and time consuming. The panels are operated by a lever system outside of the container body. Considering the size of the panels, a lot of force will be needed to manually operate the lever.

U.S. Pat. No. 4,627,658 provides a power-assisted truck body top cover. It discloses pairs of tubular metal half-frames mounted by exterior hinge means to the tops of the walls of open-top transfer semi-trailer bodies. The half-frames are covered with debris arresting means of mesh, nylon or the like. The debris arresting means are sensitive to puncture damage and are not weatherproof. Diagonal and transverse stiffeners are affixed interiorly on the half-frame by gussets to make the half-frame rigid. The system comprises a large number of parts. The half-frames are slideably connected to an arm, the rear portion of which is affixed to the shaft of a reducer attached to a hydraulic motor. The motor is installed inside the container whereas the shaft extends outside of the container. The arm affixed to the shaft is outside of the container frame too. The rotational axis of the top cover and of the shaft are different; it lacks compactness. The set-up is complex.

US 2010/0164190 discloses a trailer with a rigid container for holding loosely compacted materials. The rigid contains has a convertible rigid roof including movable rigid panels. The panels rest on a container wall with their longitudinal edge and are hinged along this edge to the container wall. A rotating means together with a bracket, provided outside of the cargo space, provide rotational movement to the panels. The panels rotate around an axis of the bracket, perpendicular to the rotating, longitudinal axis of the rotating means. This door system requires a powerful engine. Powerful engines are sizeable and add weight. The opening system for the door panels is sensitive to damage when containers are being positioned next to each other. The hinged arrangement exerts pressure on the container walls when the door panels are moved to the opened position. This may provide unwanted bulging. To counteract the bulging at least one locking bar is provided. Again, this adds weight and complexity. This is undesirable.

CN 202144276 U discloses container system with moveable door panels based on a sprocket system. The sprocket is positioned outside of the cargo space. This type of system is sensitive to damage.

KR1020180096024 discloses a container system with moveable door panels in a frame. Movement of the door panels is provided by a sprockets and movement of a sprocket is provided by a chain. This type of system is complex and is sensitive to damage. When the chain is not tensioned properly, this negatively impacts the opening of the doors.

KR1020180128575 discloses a container system with moveable door panels in frames. The door panels are hinged to a container wall. The rotating mechanism is outside of the cargo space and based on sprockets. The system requires a lot of components, is complex and sensitive to damage.

Consequently, there is a need for further alternatives and improvements.

The present invention aims to solve one or more of the above-mentioned problems.

The object of the invention is to propose a cover system for a top-loadable cargo container that is easy to manufacture, easy to install and to operate. It is an aim of the invention to provide a cover system that is economically relevant in terms of cost and efficiency.

SUMMARY OF THE INVENTION

This object is achieved with a top door system. In particular, the invention provides an automated top door system for selectively closing and opening a cargo container for top loading of cargo, the top door system comprising: a door panel, a rotary actuator driven by a motor, and a coupling means connecting said door panel and said rotary actuator, characterized in that, said door panel is a self-supporting structural lightweight, preferably frameless, door panel, and said coupling means, which is a separate part or is part of said door panel, is configured to provide rotational movement of said door panel around a rotational axis of the rotary actuator, in response to the rotary movement provided by the rotary actuator, when in use.

In a second aspect, the invention provides a top-loadable cargo container having walls providing a cargo space therebetween and a top opening, the top-loadable cargo container comprising an automated top door system for selectively closing said top opening of said top-loadable cargo container, wherein a door panel of said automated top door system is of a size and dimension to span a length and/or width of the top opening of the cargo container; characterized in that the automated top door system is an automated top door system according to an embodiment of the invention.

In a third aspect, the invention provides a transport vehicle comprising a top-loadable cargo container according to an embodiment of the invention, wherein the transport vehicle is a train, a ship, a truck, a plane.

Further preferred embodiments are elaborated in the dependent claims.

BRIEF DESCRIPTION OF THE DRAWINGS

FIGS. 2A to 2F are a schematic and three-dimensional representation of the top-loadable cargo container of FIG. 1, wherein both door panel sections are in an open position.

Figure 1:
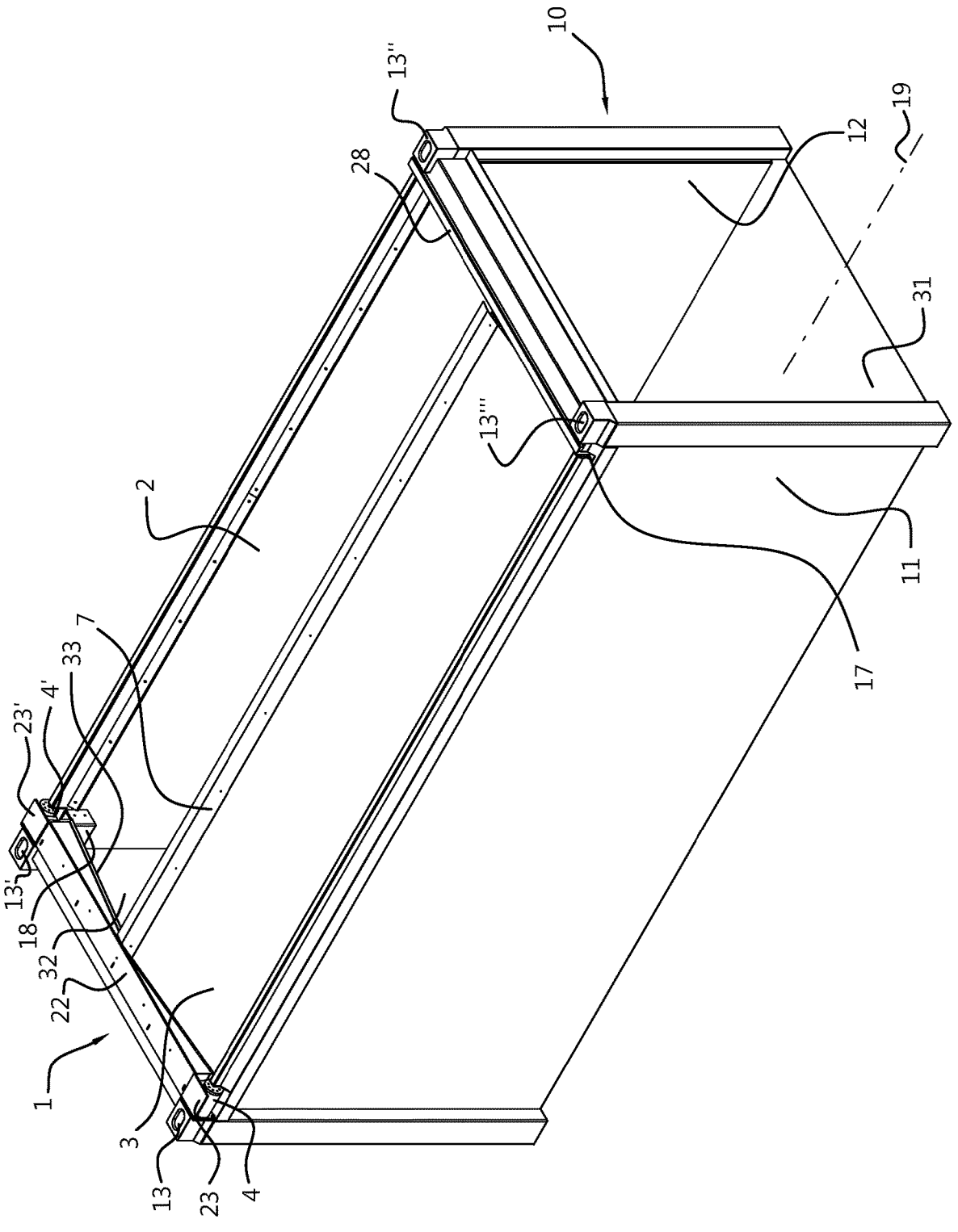
FIG. 1 is a three-dimensional representation of a top-loadable cargo container comprising a top door system according to a preferred embodiment of the invention, wherein a first door panel section is in a closed position and a second door panel section is in an open position.

The drawings are only schematic and are non-limiting. In the drawings, the size of some of the elements may be exaggerated and not drawn on scale for illustrative purposes.

DETAILED DESCRIPTION OF THE INVENTION

Unless otherwise specified, all terms used in the description of the invention, including technical and scientific terms, shall have the meaning as they are generally understood by the person skilled in the technical field the present invention relates to. Furthermore, definitions of the terms have been included for a better understanding of the description of the present invention.

As used here, the following terms shall have the following meaning: "A", "an" and "the", as used here, refer to both the singular and the plural form unless clearly understood differently in the context. For example, "a compartment" refers to one or more than one compartment.

"Approximately" as used here, that refers to a measurable value such as parameter, a quantity, an amount, a period and such, is meant to include variations of +/−20% or less, preferably +/−10% or less, more preferably +/−5% or less, still more preferably +/−1% or less, and even still more preferably +/−0.1% or less of the cited value, as far as such variations are appropriate for realizing the invention that is described. It will however be clear that the value to which the term "approximately" relates, will also be described specifically. The terms "include", "including" and "included", as used here, are synonym with "comprise", "comprising" and "comprises" and are inclusive of open terms that indicate the presence of what follows e.g. a component, and that do not exclude the presence of additional, non-said components, characteristics, elements, members, steps, that are well-known from or described in the state of the art.

The citation of numeric intervals by means of end points includes all integers and fractions included within that interval, including these end points.

In a first aspect, the invention provides an automated top door system for selectively closing and opening a cargo container for top loading of cargo.

The top door system of the invention comprises a self-supporting door panel. In a preferred embodiment the top door system comprises a single self-supporting door panel. In a more preferred embodiment, the top door system comprises two self-supporting door panel sections. By the term "self-supporting door panel" as used herein, is meant a door panel that carries its own weight.

A door panel in the door system of the invention is a structural lightweight panel. With the term "structural lightweight" as used herein, is meant a panel that is lightly built or constructed, and the panel is used for forming part of structure. In the present invention, the structure corresponds to a door or door section of a cargo container. Preferably the self-supporting structural lightweight door panel is formed of a plastic material, more preferably a thermoplastic material. The term "thermoplastic material" as used herein is a collective term for plastic that are hard at 25° C. and soften when heated. The advantage of using thermoplastic materials is their recyclability. Preferably the thermoplastic material is selected from the group of thermoplastic polyester, thermoplastic polyurethane, thermoplastic polyamide.

Even more preferably the self-supporting door panel is formed of a thermoplastic composite material. With the term "composite material" as used herein, is meant a material built up of several components with different physical or chemical properties which in combination provide an element with characteristics different from the individual components.

A preferred composite material for use in the present invention is a combination of fibers and plastic material. Fiber reinforced thermoplastic materials are particularly suitable for manufacturing self-supporting, structural lightweight door panels.

With the term "fiber-reinforced plastic" as used herein, is meant a composite material that made of a polymer matrix reinforced with fibers. The fibers may be fiberglass, carbon, or aramid. The polymer may be an epoxy, a vinyl ester, or a polyester. Preferably the fiber-reinforced plastic is a (para) aramid reinforced plastic.

The reinforcement may be provided by a material that comprises uni-aligned, twisted (in bundles) or woven tapes, strings, or yarns. By disposal in predetermined patters of subsequent layers or different layers unidirectional strength properties can be assured with the pre-tensioned strands extending inclined to each other in the same or in different layers of the material. Reinforced plastics have enhanced strength and stiffness compared to unreinforced plastics and they have improved recyclability and reduced weight compared to steel and aluminum. They also have outstanding impact energy absorption. Preferably the fiber-reinforcement is absent of abrasive fibers. This has advantages in terms of handling and tool wear.

A sandwich structure may comprise a cell structured material. Cell structured materials have the advantage that they are strong and lightweight materials.

Most preferably said cell structured material is a honeycomb cell structure material. The manufacturing of a honeycomb cell structure material for a sandwich type construction may be performed as described in U.S. Pat. No. 7,541, 085 or 5,445,861. It is an advantage of embodiments of the present invention that a material with a honeycomb structure provides firmness in several very distinct directions and not only substantially in one direction.

Most preferably the self-supporting door panel has a sandwich structure. In a preferred embodiment the self-supporting, structural light weight door panel is formed of a foamed material inserted between two layers of fiber reinforced thermoplastic material. Preferably the foamed material is also a thermoplastic material. More preferably the foamed thermoplastic material is a foamed polyester material. Most preferably the foamed material is a foamed polyethylene terephthalate (PET)-material. The foamed core may provide insulation. Foamed material is light weighted.

Alternatively, the self-supporting, structural light weight door panel is an aluminum extruded plank.

A door panel in the system of the invention is preferably frameless. This is advantageous to provide a simple and light-weight construction. With the term "frame" as used herein, is meant a rigid structure that surrounds something, in this case a door or door panel.

For the automation of the system, a rotary actuator driven by a motor is provided. By the term rotary actuator as used herein, is meant a device that produces a rotary motion via a shaft to control the speed and rotation of attached equipment. Rotary actuators transform pneumatic, hydraulic, or electric energy to mechanical rotation. The motor driving the rotary actuator may be hydraulic or electric.

As a consequence of a strong and lightweight, self-supporting door panel, the rotary actuator can be kept small in dimensions. Little space is lost when the rotary actuator is installed in a top-loadable container. Small dimensions of the rotary actuator allow the self-supporting door panel to be positioned close to the rotary actuator.

Use of a top door system according to an embodiment of the invention, excludes the use of sprockets and chains. Complexity is reduced.

In addition, a coupling means is provided for connecting a door panel to a rotary actuator. In case, several door panels are provided, each door panel is preferably connected to a rotary actuator.

The coupling means is configured to provide rotational movement to a door panel of the system. The coupling means may be a separate part. Alternatively, it may be part of said door panel. The coupling means provides rotational movement to a door panel of the system.

In a preferred embodiment of a top door system according to an embodiment of the invention, the rotational axis of the rotary actuator is the longitudinal axis of the rotary actuator and the coupling means is positioned substantially perpendicularly to said rotational axis of the rotary actuator.

Preferably, the coupling means in the top door system according to an embodiment of the invention, is fixedly connected to said door panel. This is beneficial to reduce the use of hinges. The use of hinges along the longitudinal edge of the panel, between the rotary actuator and the panel end opposite the panel end facing the rotary actuator, can be abandoned. A simple and compact system is provided.

Preferably, said coupling means is an arm which is coupled at one end to the rotational axis of the rotary actuator and over substantially the length of the arm is attached to the frameless, self-supporting door panel. This configuration provides rotational movement of the panel when the rotary actuator is in use. Preferably the arm is fixedly attached to the frameless, self-supporting door panel. A club-shaped is most preferred. In this embodiment, the broader part of the arm, at one end of the arm, is designed to be attachable to the rotary actuator. In addition, the rod part of the club-shaped arm can be designed to be attachable over the length of the rod part to a door panel. Preferably the club-shaped arm is provided with openings in the rod part for receipt of attachment means. Attachment means that can be used are for instance, screws and bolts. Alternative means of attachment are glue, adhesives, joints obtained by heating or laser energy.

Preferably, a second coupling means is provided, for connecting a door panel near a corner in the top opening of a cargo container. Said second coupling means may be a separate part or may be part of said door panel. The second coupling means is provided opposite to the first coupling means. The second coupling means is attachable to the short edge of a door panel or door panel section. The second coupling means is preferably a club-shaped arm, designed to be attachable over the length of the rod part to a door panel.

Attachment of a door panel or door panel section to the arm part and not to the club-shaped part of the arm, provides a spacing between the panel or door panel section and a container wall, when mounted. This is beneficial for lifting the door panel or door panel section over the container wall in case of more than 90° rotation.

Alternatively, the coupling means is part of the self-supporting door panel. As the door panel is made of plastic material, there is a large freedom of shaping. In a preferred embodiment said coupling means is provided by said frameless, self-supporting door panel which is configured on a side wall to provide a club-shaped surface for coupling to said rotational axis of the rotary actuator.

These preferred coupling means are simple in design. The system is kept compact and easy to install.

The top door system of the present invention is configured to rotate around a rotational axis of the rotary actuator, in response to the rotary movement provided by the rotary actuator, when in use.

Preferably, the rotary actuator is configured to provide up to 270 degrees rotation for said frameless, self-supporting structural light weight door panel. A rotation of more than 90 degrees is favorable for moving a self-supporting door panel from a substantially horizontal position wherein the top opening of the top-loadable container is closed, to a position wherein the self-supporting door panel is in a substantially vertical position wherein the top opening of the top-loadable container is open. Most preferably, the self-supporting door panel is moved away from the top opening in such a way that the self-supporting door panel takes up a minimum of space next to the container walls. This is the case for a 270 degrees rotation.

Preferably, a frameless, self-supporting structural light weight door panel, defined between at least three side walls, is reinforced on at least one of its side walls. A reinforcement of the edges is advantageous to prevent or reduce damage. The reinforcement can be obtained with a hard part that is positioned over a door panel edge. Alternatively, more reinforcement can be provided at the edge of a door panel in the manufacturing process of the door panel. For instance, the amount of reinforcing fibers used at the edge of a door panel can be increased versus the amount of reinforcing fibers used elsewhere in the door panel. In a preferred embodiment said self-supporting door panel is reinforced at an edge running parallel with a cargo container wall when in use.

Preferably, a side wall of said frameless, self-supporting door panel is provided with a rubber slab. Most preferably a rubber slab is used when the door system according to the invention is made of two door halves. It is advantageous to provide weather proofing to the opening between the door halves. The rubber slab may prevent water from entering the opening between door panels.

Preferably, the top door system of the invention does not comprise more than two hinges including said coupling means connected to said rotary actuator. Hinges, positioned alongside the length of a door panel, are typically used for attaching a door panel to the walls of a cargo container. Consequently, movement of the door panels exerts force on the wall. This may lead to deformation and damage. In addition, when cargo containers are loaded with cargo the walls tend to bulge. This is problematic for a top door system using hinges positioned alongside the length of the door panel. Alternatively, top door systems may use a long rod attached to the longitudinal edge of a door panel. This, however, requires a lot of force from the motor. A powerful engine is costly and bulky. Use of a top door system according to an embodiment of the invention is advantageous because movement of the door panel has little influence on the cargo wall.

A top door system according to an embodiment of the invention is preferably used on open top shipping containers. Preferably, the shipping container conforms to an international standard such as ISO, International Union of Railways (UIC), International Road Transports (TIR) or Container Safety Convention (CSC).

A top door system according to an embodiment of the invention may be provided as a kit for mounting on a cargo container. Alternatively, it may be built in at the construction stage of the container.

In a second aspect, the invention provides a top-loadable cargo container having walls providing a cargo space therebetween and a top opening for receipt of cargo, the top-loadable cargo container comprising an automated top door system according to any an embodiment of the invention for selectively closing said top opening of said top-loadable cargo container, characterized in a door panel of said automated top door system is of a size and dimension to span a length and/or width of the top opening of the cargo container.

By the term "of a size and dimension to span" is meant a unitary door panel, not comprising subpanels, is used. The panel spans a distance between opposite walls of a transport container, when in use. This heavily reduces the number of components to cover an open-top cargo container.

By the term "cargo container" or "container" as used herein, is meant a receptacle or enclosure for holding an object or materials for storage, packaging, and transportation. Transportation may be over sea, land, rail or air.

In a preferred embodiment, said cargo container is a 10-, 20-, 25-, 30-, 40- or 45-foot ISO container. Preferably said cargo container is a 10-, 20-, or 30-foot ISO container.

In an alternative preferred embodiment, said cargo container is a container for use on a freight train with the standard length of an ISO container of between 6.06 meter (20 ft container) and 13.72 meter (45 ft container). The height of the container may be as low as 0.5 meter. The width is at most 2.6 meters.

In another preferred embodiment, said cargo container is the cargo space on a tipper truck or dumper truck. Preferably a tipper truck comprises an open-box bed, which is hinged at the rear and equipped with hydraulic rams to lift the front, allowing material in the bed to be deposited or dumped on the ground behind the truck at the site of delivery. The open-box bed is top-loadable. The top opening can be equipped with the top door system according to an embodiment of the invention.

In a preferred embodiment, two door halves are used which each span about half the distance of the cargo container width. Preferably said two door halves each cover half of the top opening of the cargo container. In a preferred embodiment, a door or door half spans between 1.3 and 2.6 meters of container width.

In a preferred embodiment, a door or door half covers between 5.5 and 14 meters of container length. More preferably, a door or door half covers between 6 and 13.5 meters of container length. Most preferably, a door or door half covers between 7 and 13.0 meters of container length.

Preferably, the rotary actuator is positioned in a corner formed by two of said walls of the cargo container. Positioning inside the top opening is advantageous for the system not to extend beyond the boundaries of the cargo container.

Preferably, the top door comprises two half-door sections each of a size and dimension to span a length of the top opening of the cargo container, and about half of the width of the top opening of the cargo container, wherein the half-door sections are positioned within the walls providing the cargo space and near the top opening.

Alternatively, the rotary actuator is positioned near a corner formed by two of said walls of the cargo container.

Cargo containers often comprise a corner casting. With the term corner casting as used herein, is meant a locking device for securing cargo containers to the transport vehicles on which they are transported. Corner castings are cuboid shaped solid parts with holes in it. Corner castings are typically provided in the four corners of the floor and roof side of a cargo container. Corner castings are used together with twist locks. Twist locks are designed to go into one of the holes of a corner casting. Upon rotation of the twist lock inside the corner casting, the container is locked into place. A twist lock and corner casting together form a standardized rotating connector for securing a cargo container. The primary uses are for locking a container into place on a container ship, semi-trailer truck or railway container train, and for lifting of the containers by container cranes and side lifters.

In an automated top door system of the invention, the rotary actuator is preferably positioned next to a twist lock, said twist lock being in the corner formed by two of said walls of the cargo container.

Preferably, the cargo container is provided with a slot in the walls providing the cargo space, wherein the slot opens into the top opening of the cargo container, and the slot is configured to receive said coupling means thereby allowing 270-degree movement of said self-supporting door panel around the rotational axis of the rotary actuator.

Most preferably two slots are provided for each door or door panel, wherein the slots are positioned on opposite sides of said door or door panel.

Preferably, the top-loadable cargo container according to an embodiment of the invention, further comprises a cover means of a size and dimension to span a roof top opening between two rotary actuators positioned on either side of the longitudinal axis of the cargo container. Alternatively, a door panel may be dimensioned to also cover the gap between two rotary actuators positioned on either side of the longitudinal axis of the cargo container.

Preferably, no hinge means are used for attaching the top door closing system to the walls of said cargo container. A connection of a self-supporting door panel to a rotary actuator or to a corner of the cargo container, are not considered hinge means in this sense.

Preferably, a stopping means is provided inside the cargo space, wherein the stopping means is positioned near the top opening. A stopping means can be provided in the form of a triangular shape attached on a container wall on the inside of the cargo space. This stopping means can be used for resting of a self-supporting door panel. In a preferred embodiment, the stopping means is provided in the above-described cover means. As an example, the cover means may comprise a V-shaped ridge on which two door panel sections can rest, wherein each door panel section provides half of a door. Use of a stopping means is advantageous to support a door panel edge and/or to provide a stop for rotational movement.

In a third aspect, the invention provides a transport vehicle comprising a top-loadable cargo container according to an embodiment of the invention. The transport vehicle can be any type of equipment or vehicle for storage of cargo and maritime, land, rail or air transportation. The transport vehicle can be any vehicle fit for providing cargo transport using a cargo container. Preferably the transport vehicle carrying the cargo container is a train, a ship, a truck, a plane. Preferably the cargo is loosely compacted material, such as garbage.

The cargo container can be separable or detachable from the transport vehicle. Alternatively, the cargo container is an integral part of the transport equipment or the vehicle. Examples of a separable or detachable cargo container is an ISO shipping container, a container for transportation by rail, or a tippable body of a tipper. By the term "tipper" as used herein, is meant a goods vehicle with a tippable body, used for carrying loose materials such as gravel or rubble, a tipper truck or lorry. Examples of a cargo container that is an integral part of the transport equipment or the vehicle, is the loading space of one-piece cargo van or truck.

The invention is further illustrated by means of examples. These examples are non-limiting.

EXAMPLES

Example 1

Figures 2A, 2B, 2C:
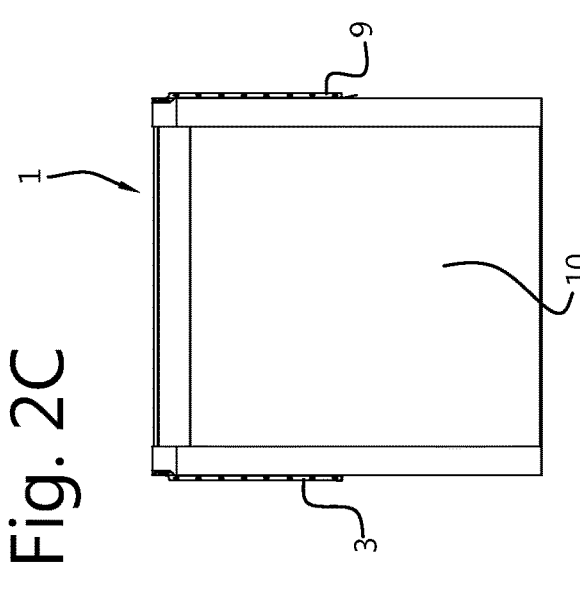
Figure 3:
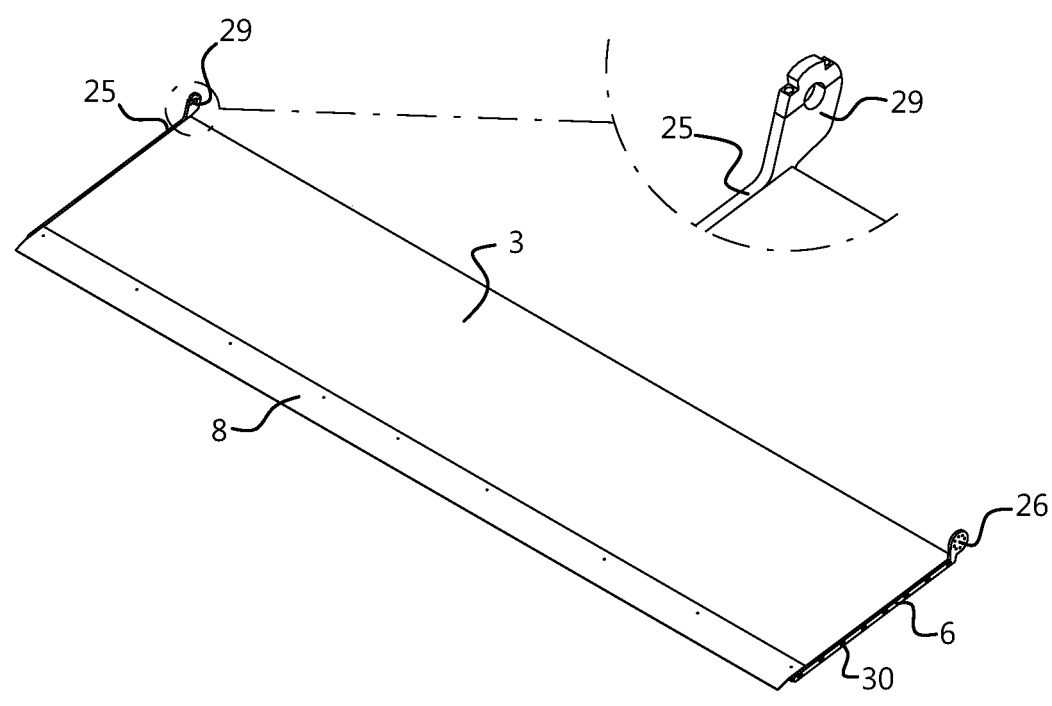
FIG. 3 is an enlarged three-dimensional representation of the first door panel section as depicted in FIGS. 1 and FIGS. 2A to 2F.
Figure 4:
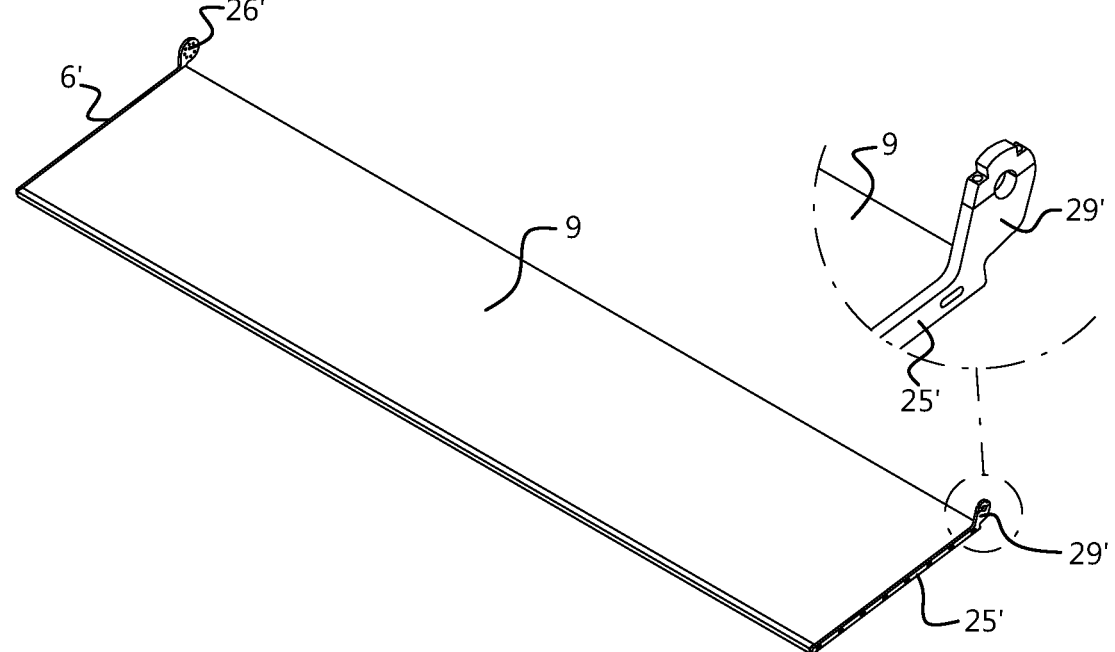
FIG. 4 is an enlarged three-dimensional representation of the second door panel section as depicted in FIGS. 1 and FIGS. 2A to 2F.
Figure 5:
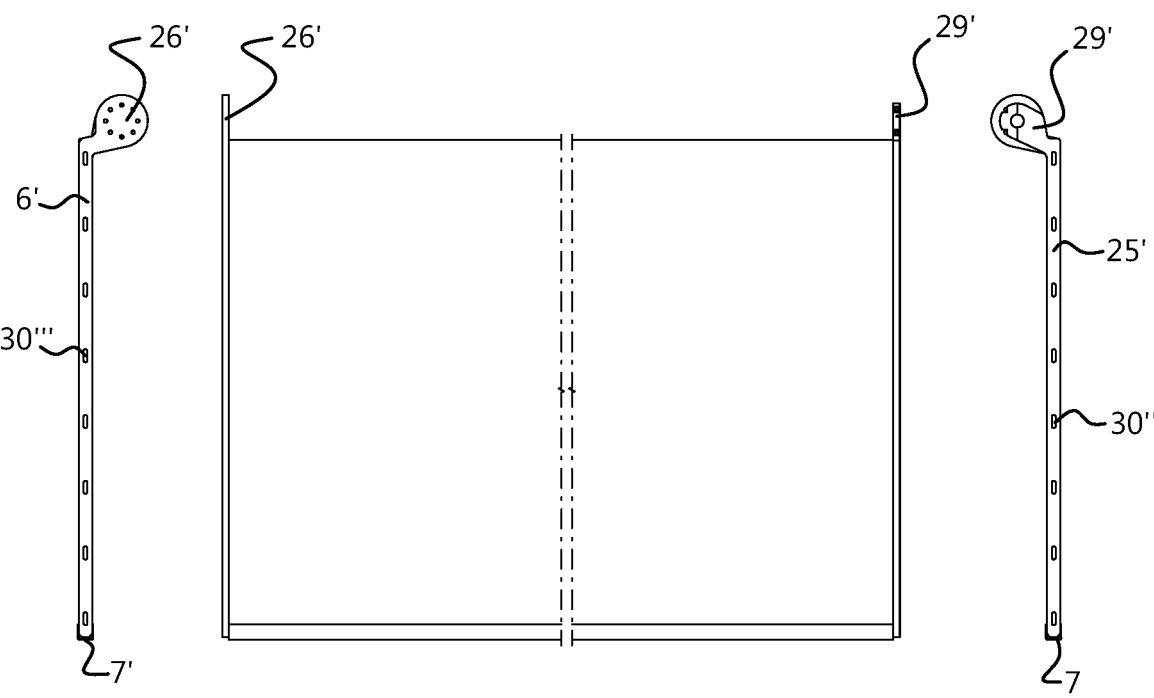
FIG. 5 is an enlarged schematic representation of a side view on the arms of the first door panel section as depicted in FIGS. 1 and FIGS. 2A to 2F.
Figure 6:
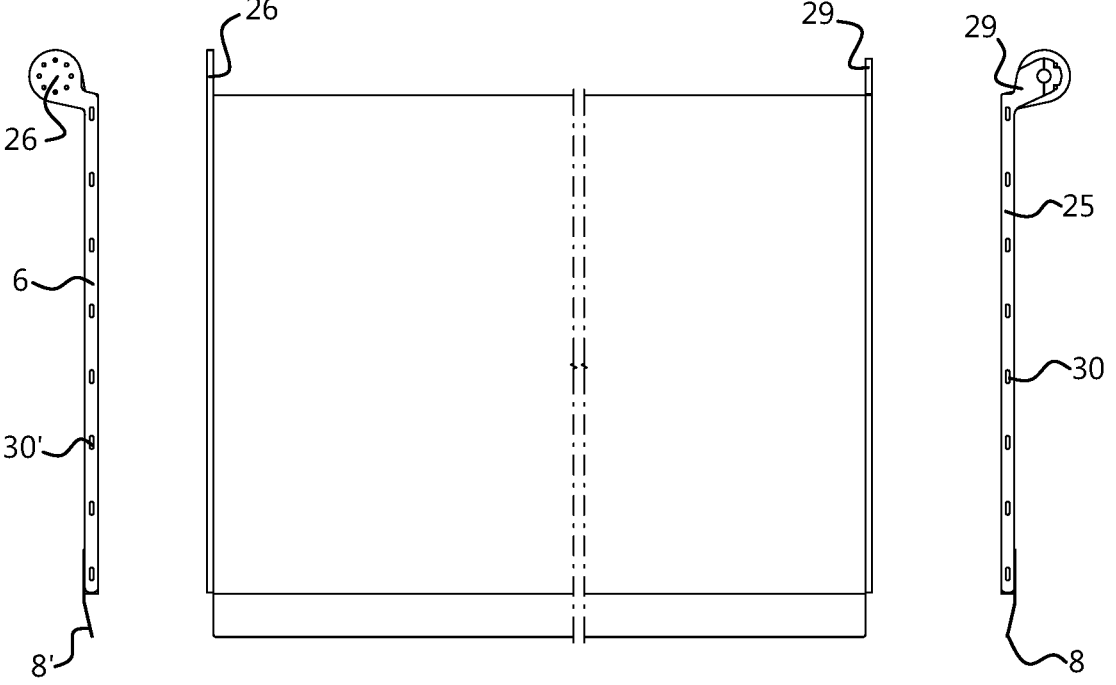
FIG. 6 is an enlarged schematic representation of a side view on the arms of the second door panel section as depicted in FIGS. 1 and FIGS. 2A to 2F.
Figure 7A:
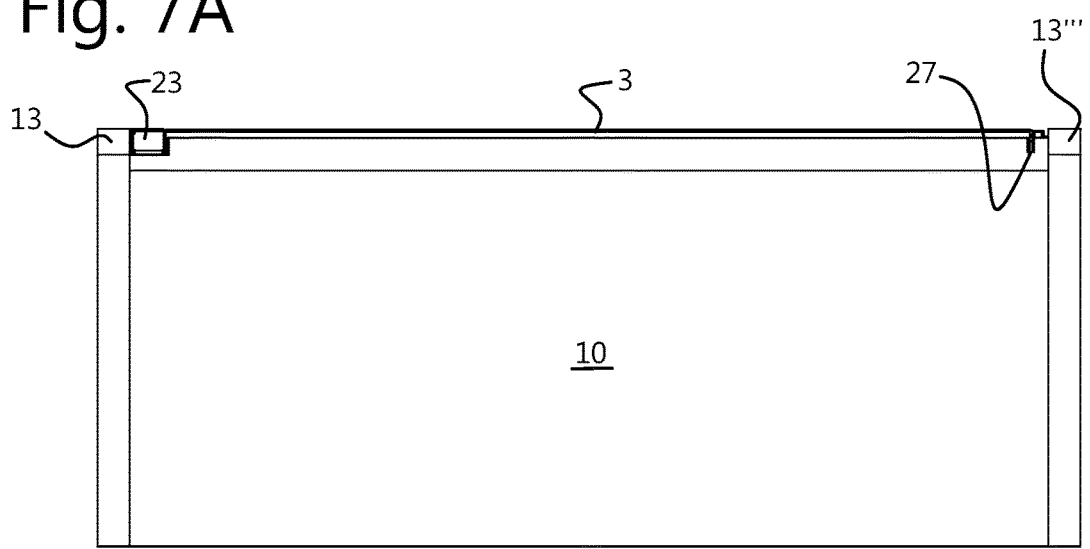
FIGS. 7A to 7H are a schematic and three-dimensional representation of the top-loadable cargo container of FIG. 1, wherein both door panel sections are in closed position.
Figure 7B:
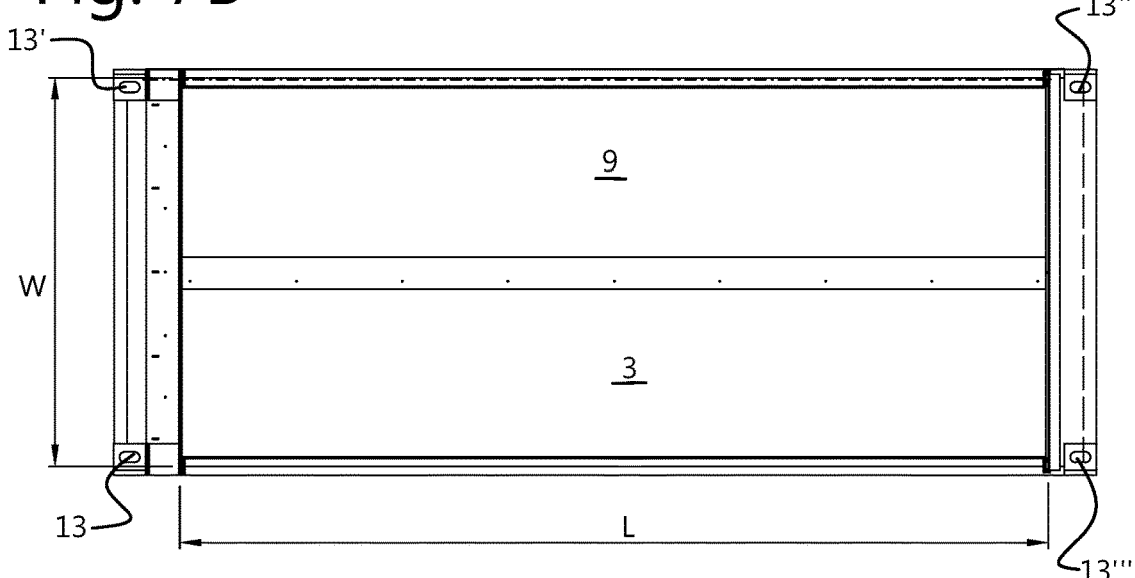
Figure 7C:
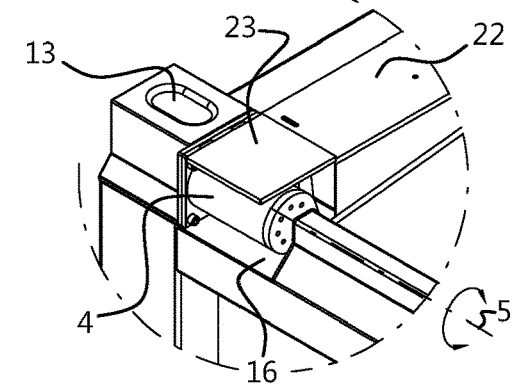
Figure 7D:
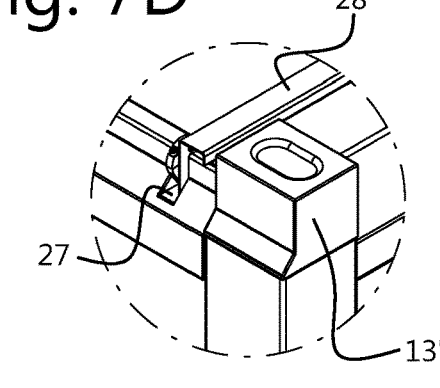
Figure 7E:
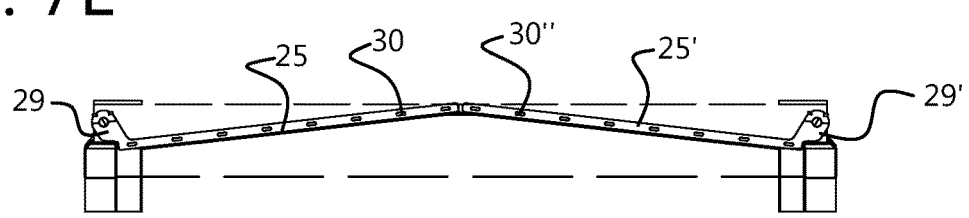
Figure 7F:
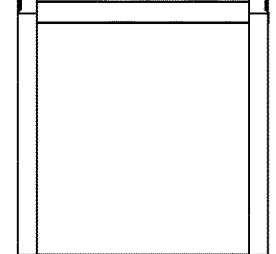
Figure 7G:
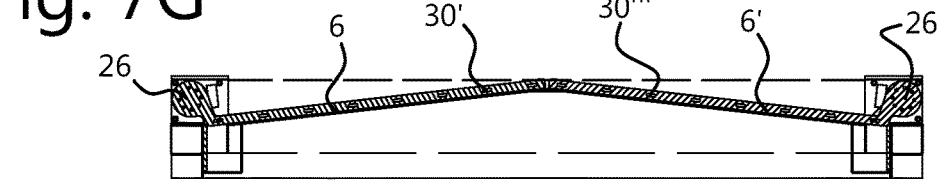
Figure 7H:
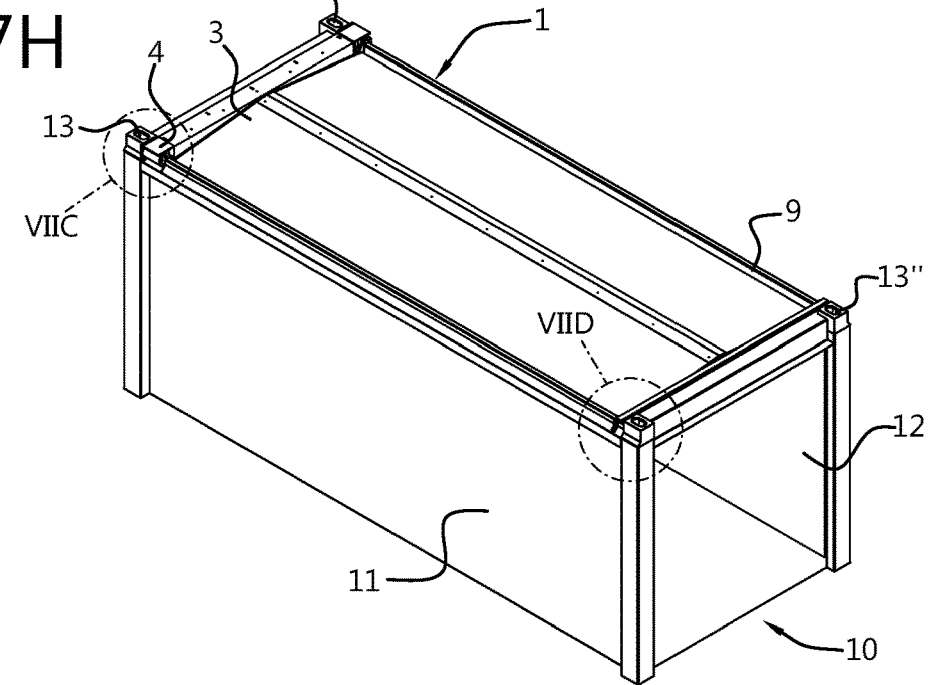

In FIGS. 1 to 7H a top-loadable cargo container 10 is depicted. The cargo container 10 has a floor 31 and three side walls 11, 12, 32 enclosing a cargo space. A fourth wall or side door may be used for closing-off the open side of the container. The top corners of the container are provided with a corner-casting 13.

The top opening 2 of the cargo container 10 comprises a top door system 1 according to an embodiment of the invention. The top door system 1 comprises two structural lightweight door panels 3, 9 for covering the open top 2 of the cargo container 10. A panel is defined by two short and two long edges.

The first and second door panel 3, 6 are self-supporting structural lightweight door panels. They carry their own weight, without use of a frame. The door panels are each of a size and dimension to span the length of the top opening of the cargo container 10 and half of the width of the top opening 2 of the cargo container 10. The edges of the door panel sections facing the middle of the top opening of the cargo container 10, are additionally provided with a reinforcement 7, 7'.

The structural lightweight door panel sections are formed of a fiber reinforced thermoplastic material, in particular polyethylene terephthalate, abbreviated as PET, and polyamide fibers.

On each of the short edges is attached a club-shaped arm 6, 25. One of the club-shaped arms 6 is designed for attachment to a rotary actuator 4. The second club-shaped arm 25 is designed for attachment to a spacer 28. Each arm has a widened region on one end and a rod part 27. The rod part 27 is provided with openings for attachment means 30. Attachment means can be screws and bolts. Alternatively, the rod part 27 and plate 3 are joined by melting, gluing, or other known means of joining.

The first door panel section 3 is provided with a slab 8. This may be used for waterproofing the opening between two door panel sections when in closed position, e.g. substantially horizontal position in view of the floor 31 of the cargo container 10.

Two rotary actuators 4, 4' are provided on opposing sides of the container wall 32 opposite the opening in the side wall of the container; one rotary actuator for each of the door panel sections 3, 9. The rotary actuator is covered with a cover plate 23. The widened region of a club-spaced arm 6 is attached to the rotary actuator. The rotational axis of the rotary actuator 5 coincides with the center of the widened region, the disc part, of the club-spaced arm 6.

Between a rotary actuator and the top edge of the container wall along the longitudinal axis of the container 19, a slot 16 is provided for allowing the first panel section 6 to rotate 270 degrees. Between a spacer 28 and the second club-shaped arm 25 a second slot 17 is provided for allowing the first door panel section 3 to rotate 270 degrees.

Rotary movement of the rotary actuator 4 translates in rotary movement of the club-spaced arm 6. The door panel section 3 hereby rotates around the rotational axis of the rotary actuator up to 270 degrees.

Between the cover plates 23, 23' of the rotary actuators 4, 4' a cover plate 22 is provided. The cover plate 22 comprises a V-shaped ridge 33. The V-shaped ridge 33 provides a stopping means for the first and second door panel sections 3, 9. The cover plate 22 closes the part of the top opening that cannot be covered by the door panel sections. Because of the self-supporting, frameless, light weight nature of the door panel sections, the size of the rotary actuator and cover plate 22 can be kept minimal. In closed position of the door panel sections 3, 9, the door system 1 is within the boundaries of the cargo container 10.

Example 2

A transport container of the top-loadable and tipping box type was provided with an automated top door system according to an embodiment of the invention, particularly with a roof top system as provided in example 1. The top door panel was made of fiber reinforced thermoplastic material (organosheet). A 3 mm thick door panel had a weight of 3, 4 or 5 kg/mm². The container was loaded with carbage from the top and closed. The loaded container was transported to a waste processing facility. The carbage was off-loaded by tipping the container and opening a wall panel at the back of the container.

It was observed that the roof-panel withstood the forces exerted on the roof-panel during emptying of the container.

Example 3

A transport container of the top-loadable and tipping box type was provided with an automated top door system according to an embodiment of the invention, particularly with a roof top system as provided in example 1. The top door system had two door panels spanning the length of the cargo opening. The panels were fiber reinforced thermoplastic panels (organosheet). A 3 mm thick door panel had a weight of 3, 4 or 5 kg/mm². The load bearing capacity of the roof top was tested by a person walking over the roof top.

It was observed that the roof-panel withstood the weight exerted on the roof-panel. The roof-panel did not open or break.

Example 4

Fiber reinforced thermoplastic panels (organosheet) of 3 mm thickness and weight of 3-5 kg/mm² for use in an automated top door system according to an embodiment of the invention were tested for vacuum resistance. The panels were positioned in a bag. Vacuum was applied for less than a second. No plastic deformation was observed.

Example 5

To illustrate the lightweight aspect of the door panels, comparative data are provided in the following table.

| Door panel material | Thickness | Weight |
|---|---|---|
| Fiber reinforced thermoplastic panels-Organosheet (invention) | 3 mm | 3-5 kg/m2 |
| Aluminium planking (prior art) | 3 mm | 8.1 kg/m2 |
| Undulated steel sheet (prior art) | 3 mm | 23.6 kg/m2 |

The invention claimed is:

1. An automated top door system for selectively closing and opening a cargo container for top loading of cargo, the top door system comprising:
   a door panel,
   a rotary actuator driven by a motor, and
   a coupling means connecting said door panel and said rotary actuator,
   wherein said door panel is a frameless, self-supporting structural door panel, and said coupling means is a separate part or is part of said door panel and is configured to provide rotational movement of said door panel around a rotational axis of the rotary actuator, in response to the rotary movement provided by the rotary actuator, when in use,
   wherein said coupling means is provided by said door panel on a side wall of the door panel to provide a club-shaped surface for coupling to said rotational axis of the rotary actuator.

2. The top door system according to claim 1, wherein said self-supporting door panel has a thickness of at most 3.0 mm and a weight of at most 7 kg/m2.

3. The top door system according to claim 1, wherein said automated top door system does not comprise more than 2 hinges, including said coupling means connected to the rotary actuator.

4. The top door system according to claim 1, wherein said coupling means is fixedly connected to said door panel.

5. The top door system according to claim 1, wherein the rotational axis of the rotary actuator is the longitudinal axis of the rotary actuator, and the coupling means is positioned substantially perpendicularly to said rotational axis of the rotary actuator.

6. The top door system according to claim 1, wherein the self-supporting structural door panel is formed of a thermoplastic material.

7. The top door system according to claim 1, wherein said coupling means is an arm which is coupled at one end to the rotational axis of the rotary actuator and over substantially the length of the arm is attached to the door panel.

8. The top door system according to claim 1, wherein the rotary actuator is configured to provide up to 270 degrees rotation for said door panel.

9. The top door system according to claim 1, wherein said door panel, defined between at least three side walls of the door panel, is reinforced on at least one side wall of the door panel.

10. The top door system according to claim 1, wherein at least one side wall of said door panel is provided with a rubber slab.

11. A top-loadable cargo container having walls providing a cargo space therebetween and a top opening for receipt of cargo, the top-loadable cargo container comprising an automated top door system for selectively closing said top opening of said top-loadable cargo container,
    wherein a door panel of said automated top door system is of a size and dimension to span a length and/or width of the top opening of the cargo container;

wherein the automated top door system is an automated top door system according to claim 1.

12. The top-loadable cargo container according to claim 11, wherein the rotary actuator is positioned near or in a corner formed by two of said walls of the cargo container; the rotary actuator is positioned next to a corner casting, said corner casting being in the corner formed by two of said walls of the cargo container.

13. The top-loadable cargo container according to claim 11, wherein the top door comprises two half-door sections each of a size and dimension to span a length of the top opening of the cargo container, and about half of the width of the top opening of the cargo container, wherein the half-door sections are positioned within the walls providing the cargo space and near the top opening.

14. The top-loadable cargo container according to claim 11, wherein the cargo container is provided with a slot in the walls providing the cargo space, wherein the slot opens into the top opening of the cargo container, and the slot is configured to receive said coupling means thereby allowing 270-degree movement of said structural self-supporting panel around the rotational axis of the rotary actuator.

15. The top-loadable cargo container according to claim 11, further comprising a cover means of a size and dimension to span a roof top opening part between two corner castings positioned on either side of the longitudinal axis of the cargo container.

16. The top-loadable cargo container according to claim 11, wherein no hinge means is used for attaching the top door system to the walls of said cargo container, other than connection means for attachment of said door panel or door panel sections near or in a corner formed by two of said walls of the cargo container.

17. The top-loadable cargo container according to claim 11, wherein a stopping means is provided inside the cargo space and positioned near the top opening.

18. A transport vehicle comprising a top-loadable cargo container according to claim 11, wherein the transport vehicle is any type of equipment or vehicle for storage of cargo and maritime, land, rail or air transportation.

19. The transport vehicle according to claim 18, wherein the cargo is garbage.

20. A method of providing vacuum resistance to a roof top of a top-loadable cargo container, the method comprising:

installing an automated top door system according to claim 1 on the top-loadable cargo container; and operating the automated top door system to provide vacuum resistance to the roof top of the top-loadable cargo container.

* * * * *